US011767395B2

(12) United States Patent
Parris et al.

(10) Patent No.: US 11,767,395 B2
(45) Date of Patent: Sep. 26, 2023

(54) POLAR FUNCTIONAL NON-AQUEOUS ACRYLIC DISPERSIONS

(71) Applicant: SUN CHEMICAL CORPORATION, Parsippany, NJ (US)

(72) Inventors: Juanita M. Parris, Montvale, NJ (US); Soichiro Omizu, Aomori (JP); Carl S. Weisbecker, New York, NY (US); Josie M. Rosen, Monroe, NY (US); Ralph Arcurio, Bridgewater, NJ (US); Ramasamy Krishnan, North Brunswick, NJ (US); Alex Chudolij, Clifton, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 597 days.

(21) Appl. No.: 16/082,628

(22) PCT Filed: Mar. 13, 2017

(86) PCT No.: PCT/US2017/022112
§ 371 (c)(1),
(2) Date: Sep. 6, 2018

(87) PCT Pub. No.: WO2017/160728
PCT Pub. Date: Sep. 21, 2017

(65) Prior Publication Data
US 2019/0112404 A1   Apr. 18, 2019

Related U.S. Application Data

(60) Provisional application No. 62/310,024, filed on Mar. 18, 2016.

(51) Int. Cl.
C08G 18/62 (2006.01)
C08F 265/06 (2006.01)
C09D 133/06 (2006.01)
C08F 265/02 (2006.01)
C08G 18/78 (2006.01)
C09D 175/04 (2006.01)
C08F 220/18 (2006.01)
C08F 220/28 (2006.01)
C08F 2/08 (2006.01)
C08F 220/06 (2006.01)
C09D 5/02 (2006.01)
C09D 11/023 (2014.01)
C08K 5/14 (2006.01)
C08K 5/1515 (2006.01)
C08K 5/23 (2006.01)

(52) U.S. Cl.
CPC .......... C08G 18/6233 (2013.01); C08F 2/08 (2013.01); C08F 220/06 (2013.01); C08F 220/1804 (2020.02); C08F 220/283 (2020.02); C08F 265/02 (2013.01); C08F 265/06 (2013.01); C08G 18/6237 (2013.01); C08G 18/6254 (2013.01); C08G 18/7831 (2013.01); C09D 5/027 (2013.01); C09D 11/023 (2013.01); C09D 133/066 (2013.01); C09D 175/04 (2013.01); C08F 220/1803 (2020.02); C08F 220/1806 (2020.02); C08F 220/1808 (2020.02); C08F 220/1812 (2020.02); C08F 220/281 (2020.02); C08F 2500/24 (2013.01); C08K 5/14 (2013.01); C08K 5/1515 (2013.01); C08K 5/235 (2013.01)

(58) Field of Classification Search
CPC .... C08F 220/18; C08F 265/06; C08F 265/02; C08F 2/08; C08F 220/06; C08F 220/28; C08F 220/281; C08F 220/1803; C08F 220/1804; C08F 220/1806; C08F 220/1808; C08F 2500/24; C08G 18/6237; C08G 18/6233; C08G 18/7831; C08G 18/6254; C08K 5/14; C08K 5/1515; C08K 5/235; C09D 133/066; C09D 175/04; C09D 5/027; C09D 11/023
See application file for complete search history.

(56) References Cited

U.S. PATENT DOCUMENTS

| 4,659,769 A * | 4/1987 | Ohmura ............... C08F 293/00 524/529 |
| 5,494,954 A | 2/1996 | Das et al. |
| 6,482,474 B1 | 11/2002 | Fenn et al. |
| 6,905,732 B1 | 6/2005 | Dunshee et al. |

(Continued)

FOREIGN PATENT DOCUMENTS

WO   WO 1995/027012 A1   10/1995

OTHER PUBLICATIONS

International Search Report issued in International Application No. PCT/US2017/022112, dated May 19, 2017.

(Continued)

Primary Examiner — Patrick D Niland
(74) Attorney, Agent, or Firm — Marian E. Fundytus; Ostrolenk Faber LLP.

(57) ABSTRACT

Described herein is a polar non-aqueous dispersion comprising polar polymeric microparticles in a polar non-aqueous medium, the polar polymeric microparticles being insoluble in the medium and being produced by dispersion polymerization of vinyl monomers such as acrylate monomers in the medium in the presence of a polymeric acrylic stabilizer. Inks, coatings and overprint varnishes are formulated that employ the polar non-aqueous dispersion. Such inks, etc., exhibit superior chemical resistance properties, for example in one-part and two-part systems.

21 Claims, No Drawings

(56) References Cited

U.S. PATENT DOCUMENTS 8,734,895 B2     5/2014  Propst, Jr.
2012/0165430 A1  6/2012  Donaldson et al.

OTHER PUBLICATIONS

Written Opinion of the International Searching Authority issued in International Application No. PCT/US2017/022112, dated May 19, 2017.
International Preliminary Report issued in PCT/US2017/022112 dated Sep. 18, 2018.
Extended European Search Report issued in counterpart EP Application No. 17767270.6, dated Oct. 4, 2019.

* cited by examiner

POLAR FUNCTIONAL NON-AQUEOUS ACRYLIC DISPERSIONS

CROSS REFERENCE TO RELATED APPLICATIONS

The present application is a § 371 National Phase application based on PCT/US2017/022112 filed Mar. 13, 2017, which claims the benefit of U.S. Provisional Application No. 62/310,024, filed Mar. 18, 2016 the subject matter of each of which is incorporated by reference in their entirety.

FIELD OF THE INVENTION

Described herein are inventive non-aqueous dispersions of polar functional polymer microparticle resin materials that are polymerized from vinyl monomers in non-aqueous mediums. Another inventive aspect described herein is a process for making low viscosity, high solids-content dispersions from acrylate and vinyl monomers. In yet another inventive aspect described herein, described are thermoset polymer applications, for example, overprint varnishes and inks comprising the non-aqueous dispersions of polar functional acrylic resins. The overprint varnishes and inks may be employed as package printing inks and coatings, such as those that are applied via low viscosity applications such as flexographic, gravure and inkjet. These printing techniques benefit from the low viscosities exhibited by the inventive non-aqueous dispersions.

BACKGROUND OF THE INVENTION

Packaging materials and the inks or coatings that are part of packaging materials may be exposed to chemicals such as caustics, alcohol, acids, and oils (among others) during their lifetime. The ink, coating, or both of a packaging material that is exposed to chemicals should be resistant to the contact, that is, it should not degrade, soften, or dissolve as a result of the exposure. Further, color components of inks used on printed labels may migrate during the bottle recycling when the labels are exposed to the caustic bath, and printed films may soften when exposed to mineral oils common in lotions and transfer color when the printed surface come into contact with surface such as clothing, carpet and furniture. These effects should be avoided where possible.

U.S. Pat. No. 8,734,895 describes grease, oil and wax resistant paper compositions which are free of fluorocarbons and other volatile organic components (VOCs). The coating imparts resistance to wax, oil and grease to cellulosic substrates and required the use of a binder and calcium carbonate.

U.S. Pat. No. 6,482,474 describes a coating composition comprising: a solution of a polyisocyanate, and hydroxyl functional polymer, wherein the polyisocyanate comprises a mixture of an aliphatic polyisocyanate having an average isocyanate functionality of 2.5 or more, and diphenylmethane diisocyanate.

U.S. Pat. No. 5,494,954 describes a non-aqueous colloidal dispersion that includes vinyl monomers selected from the group consisting of acrylic acid, methacrylic acid, beta-carboxyethyl acrylate, 2-hydroxyethyl acrylate, acrylonitrile, and mixtures thereof in an amount of 50 to 100 wt %, and no more than 15 wt % of other vinyl monomers.

SUMMARY OF THE INVENTION

Described herein in one inventive aspect is a polar non-aqueous dispersion comprising polar polymeric microparticles in a polar non-aqueous medium, the polar polymeric microparticles being insoluble in the medium and being produced by dispersion polymerization of vinyl monomers in the medium in the presence of a polymeric acrylic stabilizer, the vinyl monomers comprising a vinyl monomer component comprising hydroxyalkyl esters of αβ-unsaturated carboxylic acids with primary or secondary hydroxyl groups and mixtures thereof, and optionally a vinyl monomer component comprising one or more other vinyl monomers selected from functional or non-functional vinyl monomers, wherein on a weight basis of total monomers present, the amount of (a) acrylic acid, methacrylic acid, betacarboxyethylacrylate, 2-hydroxyethyl acrylate, acrylonitrile, and mixtures thereof is less than 50 wt %; and/or the amount of vinyl monomer other than those in (a) is greater than 50 wt %.

The indication that "on a weight basis of total monomers present, the amount of (a) acrylic acid, methacrylic acid, betacarboxyethylacrylate, 2-hydroxyethyl acrylate, acrylonitrile, and mixtures thereof is less than 50 wt %; and/or the amount of vinyl monomer other than those in (a) is greater than 50 wt %" shall hereinafter be referred to as the "proviso". The proviso specifies two conditions, wherein at least one of them is to be met. For example, the amounts of the monomers identified in (a) should be present, individually or collectively, in an amount less than 50 wt %, and/or the amount of monomers other than those identified in (a) should be present in an amount that is greater than 50 wt %. The proviso is inclusive of the monomers used in polymerizing the polymeric acrylic stabilizer, e.g., the monomers used in polymerizing the polymeric acrylic stabilizer are considered to be among the "total monomers present".

In one aspect, the vinyl monomers are acrylic monomers. In another aspect, the polar non-aqueous medium is selected from esters, ketones, and mixtures thereof. In another aspect, an acrylic polymer stabilizer is free of polymerizable unsaturation is present in the non-aqueous medium during the dispersion polymerization of the vinyl monomers. In yet another inventive aspect, the polymer chains comprising the polar polymeric microparticles are crosslinked; that is, a cross-linking agent may be added to the polar non-aqueous medium during polymerization of the vinyl monomers, or after polymerization is completed.

In yet another inventive aspect, a second polar non-aqueous dispersion is described that comprises the polar polymeric microparticles formed in a first polar non-aqueous dispersion, e.g., the dispersion described above. The polar polymeric microparticles are transferred from the first polar non-aqueous medium to a second polar non-aqueous medium that is different from the first polar non-aqueous medium. Such transfers may be desirable where the transfer non-aqueous dispersions are the be employed in radiation curable compositions, such as ink or coating compositions to be subject to curing upon exposure to ultraviolet (UV) energy or exposure to an electron beam source. Such ink or coating compositions, where appropriate may contain an initiator component, e.g., a photoinitiator.

In another inventive aspect, described herein is a method for polymerizing polar functional polymeric microparticles in non-aqueous mediums from vinyl monomers, e.g., acrylic monomers, as described above.

In another inventive aspect, described herein are printing inks and overprint varnishes that comprise the non-aqueous dispersions of polar polymeric particles that are polymerized from vinyl monomers, e.g., acrylic monomers as described above.

When applied, e.g., printed, on a substrate, the printing inks and overprint varnishes that include the non-aqueous dispersions of polar polymeric particles described herein provide improved resistance to removal. It has been found that the chemical resistance, as measured by rub resistance, of a printing ink, a coating, and/or an overprint varnish, is advantageously enhanced by the inclusion of the non-aqueous dispersions. Such printing inks include flexographic printing inks and gravure printing inks.

In one inventive aspect, provided is a process for polymerizing polar functional vinyl polymers, such as acrylic polymers, in a non-aqueous medium, thereby providing non-aqueous dispersions of polymer materials, such as polar polymer microparticles. Such a non-aqueous dispersion is among those that are well suited for use in coating and ink formulations to provide superior resistance properties.

In another inventive aspect, the polar functional non-aqueous dispersion has a number average molecular weight of at least 3,000. In another inventive aspect, the polar polymeric particles that are produced in the non-aqueous medium are of colloidal dimensions. The polar polymeric microparticles may have a size between about 0.1 microns to about 5 microns, more preferably, about 0.2 to about 2.0 microns, and even more preferably, about 0.3 microns to about 0.9 microns. Particle diameter may be used as a measure of particle size.

The inventors have surprising found that much higher amounts of vinyl monomers other than those listed in part (a0 of the proviso yield stable dispersions with improved resistance properties. It has been discovered that dispersed particles of acrylic polymers with polar functionality may be used to formulate inks and coatings that have superior resistance properties. These polymers may be used in a two part coatings or formulated into a one part, stable ink or coating.

DETAILED DESCRIPTION

The polar functional non-aqueous dispersions of the present invention comprise a non-aqueous medium in which polymeric microparticles that include polar non-functional groups are polymerized. The polymeric microparticles, which may be referred to as "polar polymeric particles" or "polar polymeric microparticles" are polymerized from vinyl monomers, such as acrylic monomers. In one aspect, such particles are stably dispersed in the non-aqueous medium by the presence of a polymeric acrylic stabilizer in the medium. Preferably, the polymeric acrylic stabilizer is free of polymerizable unsaturation. The polymeric particles are insoluble in the non-aqueous medium. The polymeric acrylic stabilizer is soluble in the non-aqueous medium. Because the polymerization is conducted directly in a non-aqueous medium, it is not necessary to dry the polar polymeric particles and transfer them to a different medium, although this is may be done and is described herein.

Definitions

As used herein, the use of the singular includes the plural unless specifically stated otherwise. For example, the singular forms "a," "an" and "the" are intended to include the plural forms, unless the context clearly indicates otherwise.

As used herein, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the description or the claims, such terms are intended to be inclusive in a manner similar to the term "comprising."

As used herein, ranges and amounts may be expressed as "about" a particular value or range. "About" is intended to also include the exact amount. For example, "about 5 percent" means "about 5 percent" and also "5 percent." "About" means within typical experimental error for the application or purpose intended.

As used herein, the terms "(meth)acrylate" or "(meth)acrylic acid" include both acrylate and methacrylate compounds, and both acrylic acid and methacrylic acid.

As used herein, "monofunctional" means having one functional group.

As used herein, "multi-functional" means having two or more functional groups. A multi-functional compound, for example a multi-functional monomer, can for example be di-functional, tri-functional, tetra-functional or an even greater number of functional groups. Two or more functional groups are, unless expressly indicated, independent of each other and, for example, can be the same or different.

As used herein, the terms "monomer" or "monomers" is intended to embrace monomers, oligomers, and mixtures thereof.

As used herein, the terms "polymer" and "polymers" includes copolymers unless indicated otherwise.

As used herein, the terms "inks and coatings," "inks," "compositions" and "fluids" are used interchangeably.

Throughout this disclosure, all parts and percentages are by weight (wt % or mass % based on the total weight) and all temperatures are in ° C. unless otherwise indicated.

The term "polar" as used herein exemplary describes groups such as hydroxyl groups, carboxyl or other acid groups, carbonyl groups, ether groups, ester groups, amide groups, amino groups, halogenated hydrocarbon groups, nitrile groups, or other such polar groups, or mixtures of these polar functional groups.

The polar functional non-aqueous dispersions are prepared from a vinyl monomer component comprising hydroxyalkyl esters of αβ-unsaturated carboxylic acids with primary or secondary hydroxyl groups. Mixtures of such hydroxyalkyl esters with primary hydroxyl groups and such hydroxyalkyl esters with secondary hydroxyl groups may also be used. Examples of suitable hydroxyalkyl esters of αβ-unsaturated carboxylic acids with primary hydroxyl groups are hydroxyethyl acrylate, hydroxypropyl acrylate, hydroxylbutyl acrylate, hydroxyamyl acrylate, hydroxylhexyl acrylate, hydroxyoctyl acrylate and the corresponding (meth)acrylates, e.g., hydroxyethyl (meth)acrylate, hydroxypropyl (meth)acrylate, hydroxylbutyl (meth)acrylate, hydroxyamyl (meth)acrylate, hydroxylhexyl (meth)acrylate, and hydroxyoctyl (meth)acrylate. Examples of suitable hydroxyalkyl esters with a secondary hydroxyl group are 2-hydroxypropyl acrylate, 2-hydroxybutyl acrylate, 3-hydroxybutyl acrylate and the corresponding (meth)acrylates, e.g., 2-hydroxypropyl (meth)acrylate, 2-hydroxybutyl (meth)acrylate, 3-hydroxybutyl (meth)acrylate. More than one monomer may be employed. The monomers are chosen such that they are soluble in the non-aqueous polar medium in which polymerization is conducted, while the resulting polymer is insoluble.

In one inventive aspect, the vinyl monomer component is entirely comprised of the vinyl monomer component comprising hydroxyalkyl esters of αβ-unsaturated carboxylic acids with primary or secondary hydroxyl groups. In another inventive aspect, other non-functional vinyl monomers or functional vinyl monomers, that is, other non-functional vinyl monomers or functional vinyl monomers than those listed above may be also be included in the non-aqueous medium and participate in the polymerization that forms the polar polymeric microparticles. Such other vinyl monomers should be soluble in the non-aqueous medium. Examples of other vinyl monomers include vinyl ester monomers such as acetoacetoxyethyl (meth)acrylate, methyl (meth)acrylate, ethyl (meth)acrylate, propyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, octadecenyl (meth)acrylate as well as the corresponding esters of maleic, fumaric, crotonic, isocrotonic, vinylacetic and itaconic acids. In addition, other ethylenically unsaturated compounds are suitable, for example alkoxyethyl acrylates, aryloxyethyl acrylates and the corresponding (meth)acrylates, for example butoxyethyl (meth)acrylate, phenoxyethyl (meth)acrylate; unsaturated carboxylic acids, for example acrylic acid, methacrylic acid, itaconic acid, crotonic acid and half-esters of maleic and fumaric acids as well as their mixtures; unsaturated compounds with tertiary amino groups, for example N,N'-diethylaminoethyl (meth)acrylate, 2-vinylpyridine, 4-vinylpyridine, vinylpyrroline, vinylquinoline, vinylisoquinoline, N,N'-dimethylaminoethyl vinyl ether and 2-methyl-5-vinylpyridine; compounds such as acrylonitrile, methacrylonitrile, acrolein and methacrolein and the like. Glycidyl (meth)acrylate and glycidyl acrylate may also be used. Mixtures of the above monomers may also be used.

In one inventive aspect, the polar polymer microparticles within the non-aqueous dispersion are formed, e.g., polymerized, exclusively (e.g., 100%) from vinyl monomers comprising hydroxyalkyl esters of αβ-unsaturated carboxylic acids with primary or secondary hydroxyl groups and mixtures thereof. This inventive aspect is subject to the proviso, and thus 2-hydroxyethyl acrylate would not be present in an amount greater than 50 wt %.

In another inventive aspect, the polar polymer microparticles within the non-aqueous dispersion are formed, e.g., polymerized, from a vinyl monomer component comprising hydroxyalkyl esters of αβ-unsaturated carboxylic acids with primary or secondary hydroxyl groups and mixtures thereof, and from a vinyl monomer component comprising one or more other vinyl monomers selected from functional or non-functional vinyl monomers. This inventive aspect is subject to the proviso, and thus the amount of (a) acrylic acid, methacrylic acid, betacarboxyethylacrylate, 2-hydroxyethyl acrylate, acrylonitrile, and mixtures thereof is less than 50 wt %; and/or the amount of vinyl monomer other than those in (a) is greater than 50 wt %.

In yet another inventive aspect, based on the total amount on a weight basis of the vinyl monomer component comprising hydroxyalkyl esters of αβ-unsaturated carboxylic acids with primary or secondary hydroxyl groups and mixtures thereof and the vinyl monomer component comprising one or more other vinyl monomers selected from functional or non-functional vinyl monomers that form, e.g., polymerize, into the polar polymer microparticles in the non-aqueous dispersion, the amount of the vinyl monomer component comprising hydroxyalkyl esters of αβ-unsaturated carboxylic acids with primary or secondary hydroxyl groups and mixtures thereof is about 1%; 2%; 3%; 4%; 5%; 6%; 7%; 8%; 9%; 10%; 11%; 12%; 13%; 14%; 15%; 16%; 17%; 18%; 19%; 20%; 21%; 22%; 23%; 24%; 25%; 26%; 27%; 28%; 29%; 30%; 31%; 32%; 33%; 34%; 35%; 36%; 37%; 38%; 39%; 40%; 41%; 42%; 43%; 44%; 45%; 46%; 47%; 48%; 49%, 50%, 51%; 52%; 53%; 54%; 55%; 56%; 57%; 58%; 59%; 60; 61%; 62%; 63%; 64%; 65%; 66%; 67%; 68%; 69%; 70%; 71%; 72%; 73%; 74%; 75%; 76%; 77%; 78%; 79%; 80%; 81%; 82%; 84%; 85%; 86%; 87%; 88%; 89%; 90%; 91%; 92%; 93%; 94%; 95%; 96%; 97%; 98%; or 99%; and the amount of the vinyl monomer component comprising one or more other vinyl monomers selected from functional or non-functional vinyl monomers is about 1%; 2%; 3%; 4%; 5%; 6%; 7%; 8%; 9%; 10%; 11%; 12%; 13%; 14%; 15%; 16%; 17%; 18%; 19%; 20%; 21%; 22%; 23%; 24%; 25%; 26%; 27%; 28%; 29%; 30%; 31%; 32%; 33%; 34%; 35%; 36%; 37%; 38%; 39%; 40%; 41%; 42%; 43%; 44%; 45%; 46%; 47%; 48%; 49%, 50%, 51%; 52%; 53%; 54%; 55%; 56%; 57%; 58%; 59%; 60; 61%; 62%; 63%; 64%; 65%; 66%; 67%; 68%; 69%; 70%; 71%; 72%; 73%; 74%; 75%; 76%; 77%; 78%; 79%; 80%; 81%; 82%; 84%; 85%; 86%; 87%; 88%; 89%; 90%; 91%; 92%; 93%; 94%; 95%; 96%; 97%; 98%; or 99%. This inventive aspect is subject to the proviso, and thus the amount of (a) acrylic acid, methacrylic acid, betacarboxyethylacrylate, 2-hydroxyethyl acrylate, acrylonitrile, and mixtures thereof is less than 50 wt %; and/or the amount of vinyl monomer other than those in (a) is greater than 50 wt %.

The polymers of the polar polymeric particles may be crosslinked or uncrosslinked. Should crosslinked polymers be produced, then a crosslinking agent may be included in the non-aqueous medium, during polymerization of the polar polymer microparticles. In another aspect, the crosslinking agent may be added to the non-aqueous dispersion reaction after polymerizing the polar polymer microparticles.

In one aspect, the kind of crosslinking agent and the amount in which it is added are chosen based on the functional groups present in the polar polymeric particles, which derive from the vinyl monomers present in the non-aqueous medium. For example, polyepoxide crosslinkers such as 3,4-epoxy cyclohexylmethyl-3,4-epoxy cyclohexane carboxylate, bis(3,4-epoxy cyclohexylmethyl) adipate, 1,3,5-triglycidyl isocyanurate and pentaerythritol tetra(2-glycidyloxycarbonyl cyclohexane carboxylate) are preferred when the polar polymeric particles contain carboxylic acid functionality. When the polar polymeric particles contain hydroxyl functionality, polyisocyanate or polyanhydride crosslinkers are preferred. Examples of suitable polyisocyanate crosslinkers include aromatic diisocyanates such as diphenylmethane-4,4'-diisocyanate or m-phenylene diisocyanate; aliphatic diisocyanates such as hexamethylene diisocyanate or tetramethylxylene diisocyanate; cycloalkylene diisocyanates such as 1,4-cyclohexane diisocyanate or isophorone diisocyanate; tri- or tetra-isocyanates such as triphenylmethane-4,4',4"-triisocyanate or 4,4'-dimethyl diphenylmethane-2,2',5,5'-tetraisocyanate; polymerized polyisocyanates such as tolylene diisocyanate dimers and trimers; and the like. Examples of suitable polyanhydride crosslinkers include monomeric species such as isoprene disuccinyl anhydride or pyromellitic dianhydride. It will be appreciated by those skilled in the art that mixtures of the above crosslinking agents and other suitable ones may be employed in carrying out the inventive aspects of the present disclosure.

In one aspect, polymerization of the vinyl monomers used to prepare the polymeric particles is initiated by free radical initiators that are soluble in the non-aqueous medium. Examples include peroxy initiators such as peroxides, persulfates, perborates, percarbonates, azo compounds, etc. Suitable peroxides include benzoyl peroxide, lauroyl peroxide, hydrogen peroxide, dibenzoyl peroxide, acetyl peroxide, benzoyl hydroperoxide, t-butyl hydroperoxide, di-t-butyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, difuroyl peroxide, bis (triphenylmethyl) peroxide, bis (p-methoxybenzoyl) peroxide, p-monomethoxybenzoyl peroxide, ru-bene peroxide, ascaridol, t-butyl peroxybenzoate, diethyl perox-yterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, alpha, alpha'-azobis-(2-methylheptonitrile), 1, 1'-azo-bis (cyclohexane carbonitrile), 4, 4'-azobis (4-cyanopenta-noic acid), 2, 2'-azobis (isobutyronitrile), 1-t-butylazo-1-cyano-cyclohexane, persuccinic acid, diisopropyl peroxy dicarbonate, 2,2'-azobis (2, 4-dimethylvaleronitrile), 2-t-buty-lazo-2-cyano-4-methoxy-4-methylpentane, 2,2'-azobis-2-methylbuta-nenitrile, 2-t-buty-lazo-2-cyanobutane, 1-t-amylazo-1-cyanocyclo-hexane, 2,2'-azobis (2,4-dimethylpentane nitrile), 2,2'-azobis (2, 4-dimethyl-4-methoxyvaleronitrile, 2,2'-azobis-2-methylbutyronitrile, 2-t-butylazo-2-cyano-4-methyl-pentane, 2-t-butylazo-2-isobutyronitrile, to butylperoxyisopropyl carbonate and the like; a mixture of initiators may also be used. The preferred initiators are 2, 2'-azobis (2-methylbutyronitrile), 2,2'-azobis (2-methylbutanenitrile), 2,2'-azobis (isobutyronitrile), 2,2'-azobis (2, 4-dimethylvaleroni-trile), 2-t-butylazo-2-cyano-4-methoxy-4-methylpentane, 2-t-buty-lazo-2-cyano-4-methylpentane, 2-t-butylazo-2-cyano-butane and tea-butylperoxy-2-ethyl-hexanoate (tert-butylperoctoate).

Commercially available initiators that may be used in the carrying out the teachings of the present disclosure include the Luperox® organic peroxide initiators available from Arkema. For example, Luperox® 26M50 may be used.

Polymerization of the monomers used to prepare the polymeric particles is usually conducted at a temperature selected in consideration of the boiling point of the non-aqueous solvent/medium in which polymerization occurs.

The polar polymeric particles that are produced in the non-aqueous medium may be of colloidal dimensions. In one inventive aspect, the polar polymeric microparticles have a size between about 0.1 microns to 5 microns, more preferably, about 0.2 to about 2.0 microns, and even more preferably, about 0.3 microns to about 0.9 microns. Particle diameter may be used as a measure of particle size.

A polymeric acrylic stabilizer is present in the non-aqueous medium during the polymerization of the vinyl monomers. It is believed that the presence of same stabilizes the non-aqueous dispersions as the polar polymeric microparticles form in the non-aqueous medium. The polymeric acrylic stabilizer is preferably free of polymerizable unsaturation. Preferably, the polymeric acrylic stabilizer is prepared in the medium before polymerizing the polar polymer microparticles.

The polymeric acrylic stabilizer may be prepared from vinyl monomers such as, for example, non-functional vinyl monomers; hydroxyl-functional vinyl monomers; glycidyl-functional vinyl monomers; amino-functional vinyl monomers; silane-functional vinyl monomers; N-alkoxyalkyl functional vinyl monomers; and mixtures thereof. Examples of vinyl monomers used to prepare the polymeric acrylic stabilizer include methyl (meth)acrylate; methyl acrylate; n-butyl (meth)acrylate; n-butyl acrylate; lauryl (meth)acrylate, styrene; and the similar acrylates and (meth)acrylates. Examples of suitable hydroxyl-functional vinyl monomers include hydroxyethyl (meth)acrylate; 2-hydroxyethyl acrylate; 2-hydroxypropyl (meth)acrylate; 2-hydroxypropyl acrylate; and similar hydroxyl-functional vinyl monomers. Examples of suitable glycidyl-functional vinyl monomers include glycidyl (meth)acrylate; glycidyl acrylate; allyl glycidyl ether; and similar glycidyl-functional vinyl monomers. Examples of suitable amino-functional vinyl monomers include N,N'-dimethylaminoethyl (meth)acrylate; N-tert-butylaminoethyl (meth)acrylate; and similar amino-functional vinyl monomers. Examples of suitable silane-functional vinyl monomers include vinyl alkoxy, acrylato-alkoxy, and methacrylato-alkoxy silanes such as vinyl trimethoxy silane; gammamethacryloxypropyl trimethoxy silane; and similar silane-functional vinyl monomers. Examples of suitable N-alkoxyalkyl functional vinyl monomers include N-butoxymethyl acrylamide; N-isobutoxymethyl acrylamide; and similar N-alkoxyalkyl functional vinyl monomers.

Polymerization of the monomers used to prepare the polymeric acrylic stabilizer may be initiated with free radical initiators. Such initiators should be soluble in the non-aqueous medium in which polymerization of the polymeric acrylic stabilizer and the polar polymer microparticles takes place. Examples of free radical initiators are as listed above, with regard to initiators used to initiate the polymerization of the polar polymeric particles.

The non-aqueous medium in which the polymerization takes place is selected so that the vinyl monomers used to make the polar polymeric particles are soluble in the medium, but that the resulting polar polymer particles are not soluble in the medium; and so that the polymeric acrylic stabilizer and monomer used to make same is soluble in the medium. Examples of suitable candidates for the non-aqueous medium are polar ester solvents, polar ketone solvents, and mixtures thereof. In one particular aspect, the non-aqueous medium is comprised of n-propyl acetate, ethyl acetate, or a mixture of ethyl acetate and another suitable ester solvent. Other suitable ester solvents include n-butyl acetate, n-hexyl acetate, and mixtures thereof. Examples of suitable ketone solvents include methyl ethyl ketone; methyl isobutyl ketone; and mixtures thereof. Mixtures of ester and ketone solvents can also be used.

When there is a crosslinking reaction, it may take place in a step after the polar polymeric particles are formed. It is possible to perform the crosslinking reaction at the time of polymerization of the polar polymer particles, e.g., the crosslinking agent may be added to the non-aqueous medium with addition of the vinyl monomer component(s). However, the solubility conditions should be met, e.g., the crosslinking agent should be soluble in the non-aqueous medium in which polymerization is conducted, and the crosslinking agent should produce a cross-linked polar polymeric particle that is insoluble in the non-aqueous medium in which the polymerization reaction is conducted. Suitable crosslinking agents that meet these criteria include polyfunctional vinyl monomers, for example, ethylene glycol di(meth)acrylate, divinyl benzene, pentaerythritol triacrylate, and the like. However, adding excessive amounts of these types of crosslinkers may cause flocculation in the dispersion. Other crosslinking agents that meet the criteria include polyisocyanates or epoxides and may be preferred since flocculation is avoided. To avoid instability within the dispersion, in situ crosslinking of this kind may employ lower amounts of crosslinking agents compared to when a separate crosslinking step is conducted after polymerization is completed.

In one inventive aspect, the polar functional non-aqueous dispersions prepared in accordance with the present invention may be transferred to a non-aqueous medium different from that in which the dispersions are prepared. Examples of mediums to which the polar functional non-aqueous dispersions may be transferred include alcohols such as ethanol, n-propanol, isopropanol, n-butanol, and the like; esters such as n-butyl acetate, n-hexyl acetate, pentyl propionate, and the like; ethers such as the monoethyl, monobutyl and monohexyl ethers of ethylene glycol, and the like; ketones such as methyl ethyl ketone methyl isobutyl ketone, diisobutyl ketone, and the like; aromatic hydrocarbons such as xylene, or toluene, and the like; and mixtures thereof; multi-ethylenically unsaturated acrylate such as pentaerythritol triacrylate, trimethylolpropane triacrylate (TMPTA), trimethylolpropane triethoxytriacrylate (3EO-TMPTA), glyceryl tripropoxytriacrylate, and glyceryl tri(oligopropoxy)triacrylate wherein the oligopropoxy groups have from 1 to 3 propoxy groups; suitable tetraacrylates may include, for example, di(trimethylolpropane) tetraacrylate (DTMPTA), tetrafunctional polyester acrylates; suitable pentaacrylates may be those, such as, for example, dipentaerythritol pentaacrylate (DPEPA); higher functional acrylates may include, for example, dipentaerythritol hexaacrylate (DPHA). Mixtures of any such monomers may be used; and oligomers described as multi-ethylenically unsaturated acrylates having repeat backbone units, such as polyester acrylates, polycarbonateacrylates, urethane acrylates, and epoxy acrylates and mixtures and the like.

Transfer to a different medium may be achieved by, for example, spray-drying, freeze-drying, coagulation, or centrifugation followed by redispersion in the new medium. Preferably, transfer to a different medium is accomplished by adding a new organic solvent to the dispersion then removing the unwanted solvent by distillation. All of these methods are well understood by those skilled in the art and will not be discussed in further detail here.

The dispersions of polar polymeric particles prepared as described above are easily incorporated into coating compositions, for example by applying agitation to the components of the composition. The amount of solids present in the coating composition is generally from about 1% to about 90% by weight, preferably from about 5% to about 70% by weight, based on the total weight of solids present in the coating composition. Dispersions of polar polymeric particles in which the particles exhibit high levels of acid functionality are particularly useful when they are incorporated into either one-package or two package systems. Dispersions of polar polymeric particles in which the particles contain high levels of hydroxyl functionality are particularly useful when they are incorporated into melamine-, urethane-, or isocyanate-cured acrylic, polyester or epoxy coating compositions. These can also be either one-package or two-package systems.

Overprint varnishes (OPVs) provide gloss enhancement and resistance to stains, burnishing, scuff, chemicals, etc., to the underlying surface to which the varnish is applied. The inclusion of the non-aqueous dispersions containing the polar polymeric particles described herein in an OPV will further improve the properties of same.

Printing inks may be formulated to include the non-aqueous dispersions containing the polar polymeric particles described herein. Such inks will provide improved resistance to stains, burnishing, scuff, chemicals, etc.

The inks and coatings may be applied by employing a printing process such as gravure and flexo printing. Other deposition methods may also be employed, such as litho, offset, roll, spray, die coating, wicking, inkjet or screen printing may be possible. Depending on the deposition method, the rheology of the ink or coating composition may be adjusted to provide for proper deposition. While coating thickness may be affected by the deposition method that is used, thickness will generally be in the range of about 0.5 gsm to about 10 gsm (grams per square meter) dry, more preferably between about 1 gsm and about 6 gsm and even more preferably between about 1.5 gsm and about 4 gsm.

It is to be understood that the foregoing general description and the following detailed description are exemplary and explanatory only and are not restrictive of any subject matter claimed. The section headings used herein are for organizational purposes only and are not to be construed as limiting the subject matter described. Illustrating the invention are the following examples that, however, are not to be considered as limiting the invention to their details. All percentages in the examples as well as throughout the specification are weight percentages unless otherwise indicated.

Test Methods and Definitions

Method of Determining the Molecular Weight:

The molecular weights and polydispersity values were measured via Gel Permeation Chromatography (GPC) using a Waters 515 HPLC Pump equipped with a Waters 2410 refractive index detector with Waters Millennium chromatography software, version 3.0, and a Phenogel GPC 4 column set 300×7.8 mm OD, 5µ particle size and pore sizes of 100 Å, 500 Å, $10^3$ Å and $10^4$ Å. All samples were prepared as follow: a 2% solution is made by weighing approximately 0.2 g in 10 mL of THF in a 20 mL clear borosilicate vial. The vial and contents are mixed on a Titer Plate Shaker for 20 minutes at ambient temperature and then allowed to stand for 24 hours. Two to five mL is then filtered through a 0.45 µm Millipore Filter. Fifty (50) µL is injected.

As used herein, "polydispersity" or "dispersity" is the measure of the broadness of a molecular weight distribution of a polymer. It is calculated as Mw/Mn, wherein Mw is the weight average molecular weight of the polymer, and Mn is the number average molecular weight of the polymer.

Method of Determining OH Value

Hydroxyl value is calculated from the weight of hydroxyl functional monomers used.

Method of Determining Viscosity:

The viscosity was determined with a Brookfield DV-E viscometer using a #62 spindle at 100 RPM.

Method of Determining Tack:

Tack was measured with a calibrated Electronic Inkometer (Thwing-Albert Instrument Co.). Inks, primers or coatings, as described are metered to one milliliter of fluid drawn up into a syringe. The fluid is placed onto the top rubber roller of the inkometer. The inkometer is turned 'on' to start the rollers rotating and the tack value reported is the maximum value reached. The inkometer is operating at about 90° F. and 180 rpm.

Method of Proofing:

Flexographic printed inks and OPVs were applied to the substrates using a Pamarco hand-proofer. White ink was applied using a 220 l/s anilox and cyan ink was applied using a 400 l/s anilox. Gravure printed inks and OPVs were applied using wire-bound Mayer bars. Inks were applied using a #5 Mayer bar. OPVs were applied using a #6 or #8 Mayer bar. Inks were applied onto films and dried in an oven at 50° C. for 60 s. The OPV was applied over the ink using a 165 l/s anilox and dried in an oven at 50° C. for 90 seconds. Fidelity cyan ink (Sun Chemical), Shrinkpet Blue ink (Sun Chemical), DPS-261 white ink (Sun Chemical) and Harmony USA cyan ink (Sun Chemical) were used as reference inks. Harmony Gloss (Sun Chemical), a 1-pack coating, and TLXGS0612936 (Sun Chemical), a 2-pack coating, were used as reference coatings. Variplus SK (Evonik Industries AG) is an acrylic solution polymer with 300 mg KOH/g OH value, and Variplus 1201 (Evonik Industries AG) is a polyurethane polyol resin with 200 mg KOH/g OH value.

Method of Determining Mineral Oil Resistance:

A Q-tip was immersed in mineral oil and rubbed on OPV over ink in 1" strokes for 20 or 100 cycles. The amount of ink transferred to the end of the Q-tip was visually inspected and the amount of ink removed assigned a score from 1 to 10 with 1 corresponding to no ink rub off and 10 corresponding to complete removal of ink resulting in the substrate being fully exposed. The test was completed three times and the mode reported.

Method of Determining Bleed Resistance:

The labels were tested for bleed resistance one day or more after printing. The shrink sleeve labels were reverse-printed, wrapped around the tapered end of a PET bottle, printed side of the label facing inward contacting the surface of the bottle and placed in a convection oven at a temperature setting of 100° C. for 10 seconds. Each label was then cut into ¼ in. square pieces for bleed testing. Bleed resistance was measured, referencing the test procedure described in Protocol for producing PET flake for evaluation and evaluating for discoloration from "bleeding labels"', Association of Postconsumer Plastic Recyclers (www.plasticsrecycling.org), amended April 2010. The test protocol is as follows: PET flakes (weight 50 g) were added to 200 mL of an aqueous solution containing 1.0 wt. % NaOH and 0.3 wt. % Triton X-100 surfactant to simulate postconsumer recycled PET material in as wash process, forming a slurry. The source of PET flakes was Eastpak Copolyester 9921 from Eastman Chemical. This PET wash bath was heated to 85° C. while blending the slurry with an overhead stirrer at 540 rpm. Printed labels were cut into ¼ in. square pieces. A specified weight of label pieces was added to the PET wash bath amounting to either 0.3 wt % or 6 wt % of label material per weight of PET flakes in the bath. These two weight percentages correspond to the typical levels of PS label material and shrink sleeve label material affixed to recycled PET bottles. The label pieces and PET flakes were continuously stirred together in the wash bath for 15 minutes.

Label pieces and PET flakes were then filtered from the wash bath using a metal strainer. The strained material was rinsed with 200 mL of water. Label pieces, PET flakes, and wash bath solutions were retained for evaluation. Three-dimensional scale, CIE L*a*b*, was used to objectively quantify color values. This scale defines color as follows: L* (lightness) axis: black to white (0 to 100); a* (red-green) axis: positive values are red; negative values are green; 0 is neutral; and b* (yellow-blue) axis: positive values are yellow; negative values are blue; 0 is neutral. Color differences are expressed relative to a standard white a color tile. L*a*b* values of the recovered PET flakes from the bath were recorded using a Datacolor SF600 Spectrophotometer. The maximum acceptable change in color of PET flakes after exposure to labels in the wash bath is defined as follows: ΔL*<|5|; Δa*<|2|; and Δb*<|2|. An L*a*b* value change which exceeds these limits corresponds to a visually noticeable level of discoloration of the PET flakes, diminishing its value as recyclable material. The more negative is the number the less acceptable is the discoloration. Discoloration of either the PET flakes or of the recovered wash solution is scored as "fail" in the bleed test.

EXAMPLES

Example 1: (Inventive)

Step 1: Preparation of Polymeric Acrylic Stabilizer—

A 0.25 L four-neck flask, equipped with a mechanical stirrer, a reflux-condenser, a thermometer, a nitrogen inlet, and a dropping-funnel, was charged with 27.1 g of n-propyl acetate. The flask was heated with stirring to 90° C. using a mantle heater. 39.1 g of i-butyl (meth)acrylate, 27.0 g of lauryl (meth)acrylate, and 1.35 g of acrylic acid were added drop-wise by funnel with 2.8 g of n-propyl acetate and 1.4 g of Luperox 26M50 over 4 hours. After holding the flask for 1 hour at 90° C., 0.4 g of Luperox 26M50 was added in a minute. After holding the flask for 3.0 hours at 90° C., 21.5 g of n-propyl acetate was added in a minute and then resin was discharged.

Step 2: Preparation of Dispersion—

A 0.25 L four-neck flask, equipped with a mechanical stirrer, a reflux-condenser, a thermometer, a nitrogen inlet, and a dropping-funnel, was charged with 4.38 g of n-propyl acetate, 21.88 g of Step 1 (above), 0.14 g of glycidyl (meth)acrylate and 0.07 g of triphenyl phosphine. The flask was heated with stirring to 90° C. using a mantle heater. 26.05 g of methyl (meth)acrylate, 5.16 g of n-butyl (meth)acrylate, and 2.29 g of 2-hydroxylpropyl (meth)acrylate were added drop-wise by funnel with 25.92 g of n-propyl acetate and 0.32 g of Luperox 26M50 over 4 hours. After holding the flask for 1 hour at 90° C., 0.16 g of Luperox 26M50 was added in a minute. After holding the flask for 3.0 hours at 90° C., 37 g of n-propyl acetate was added in a minute and then resin was discharged. The dispersion had a Mn of 33,600 and 19 mg KOH/g hydroxyl (OH) value.

Example 2: (Inventive)

Step 1: Preparation of Polymeric Acrylic Stabilizer—

A 0.25 L four-neck flask, equipped with a mechanical stirrer, a reflux-condenser, a thermometer, a nitrogen inlet, and a dropping-funnel, was charged with 26.90 g of n-propyl acetate. The flask was heated with stirring to 90° C. using a mantle heater. 49.18 g of i-butyl (meth)acrylate, 16.86 cyclohexyl (meth)acrylate, and 1.41 g of acrylic acid were added drop-wise by funnel with 2.69 g of n-propyl acetate and 1.35 g of Luperox 26M50 over 4 hours. After holding the flask for 1 hour at 90° C., 0.4 g of Luperox 26M50 was added in a minute. After holding the flask for 3.0 hours at 90° C., 21.5 g of n-propyl acetate was added in a minute and then resin was discharged.

Step 2: Preparation of Dispersion—

A 0.25 L four-neck flask, equipped with a mechanical stirrer, a reflux-condenser, a thermometer, a nitrogen inlet, and a dropping-funnel, was charged with 4.72 g of n-propyl acetate, 21.65 g of Step 1 (above), 0.14 g of glycidyl (meth)acrylate and 0.09 g of triphenyl phosphine. The flask was heated with stirring to 90° C. using a mantle heater. 21.51 g of methyl (meth)acrylate, 9.22 g of n-butyl (meth)acrylate, and 2.30 g of 2-hydroxylpropyl (meth)acrylate were added drop-wise by funnel with 25.82 g of n-propyl acetate and 0.34 g of Luperox 26M50 over 4 hours. After holding the flask for 1 hour at 90° C., 0.15 g of Luperox 26M50 was added in a minute. After holding the flask for 3.0 hours at 90° C., 37 g of n-propyl acetate was added in a minute and then resin was discharged. The dispersion had a Mn of 37,800 and 19 mg KOH/g OH value.

Example 3 (Inventive)

Step 1: Preparation of Polymeric Acrylic Stabilizer—

A 1 L four-neck flask, equipped with a mechanical stirrer, a reflux-condenser, a thermometer, a nitrogen inlet, and a dropping-funnel, was charged with 112 g of n-propyl acetate. The flask was heated with stirring to 90° C. using a mantle heater. 204.8 g of i-butyl (meth)acrylate, 70 g of lauryl (meth)acrylate, and 5.65 g of acrylic acid were added drop-wise by funnel with 11.32 g of n-propyl acetate and 5.64 g of Luperox 26M50 over 4 hours. After holding the flask for 1 hour at 90° C., 1.3 g of Luperox 26M50 was added in a minute. After holding the flask for 3.0 hours at 90° C., 89.7 g of n-propyl acetate was added in a minute and then resin was discharged.

Step 2: Preparation of Dispersion—

A 1 L four-neck flask, equipped with a mechanical stirrer, a reflux-condenser, a thermometer, a nitrogen inlet, and a dropping-funnel, was charged with 4.38 g of n-propyl acetate, 21.84 g of Step 1 (above), 0.14 g of glycidyl (meth)acrylate and 0.06 g of triphenyl phosphine. The flask was heated with stirring to 90° C. using a mantle heater. 24.1 g of methyl (meth)acrylate, 10.3 g of n-butyl (meth)acrylate, and 2.52 g of 2-hydroxylpropyl (meth)acrylate were added drop-wise by funnel with 27.8 g of n-propyl acetate and 0.38 g of Luperox 26M50 over 4 hours. After holding the flask for 1 hour at 90° C., 0.18 g of Luperox 26M50 was added in a minute. After holding the flask for 3.0 hours at 90° C., 70 g of n-propyl acetate was added in a minute and then resin was discharged. The dispersion had a Mn of 45,100, 19 mg KOH/g OH value and a tack of 4.2 tack units.

Example 4 (Comparative)

A hydroxy functional polyether polyurethane resin solution was obtained from a commercial vendor (Trade name Neorez U-392 from DSM.) The material is composed of 75% solids in ethyl acetate solvent. It has a Brookfield viscosity of 150 mPa·s at 25° C. and a hydroxyl value of 37 mg KOH/g.

TABLE 1

Composition of OPV used in Bleed Testing

| Ingredient | OPV 1 | OPV 2 | OPV 3 | OPV 4 |
|---|---|---|---|---|
| Variplus 1201 | 22.54 | 22.54 | 22.54 | 21.92 |
| Example 1 (Inventive) | 22.54 | | | |
| Example 2 (Inventive) | | 22.54 | | |
| Example 3 (Inventive) | | | 22.54 | |
| Example 4 (Comparative) | | | | 21.92 |
| n-Propyl Acetate | 32.38 | 32.38 | 32.38 | 34.24 |
| Desmodur N75BA | 22.54 | 22.54 | 22.54 | 21.92 |
| Total | 100.00 | 100.00 | 100.00 | 100.00 |

TABLE 2

Bleed Resistance of Shrink Labels Structures on PET-G

| Example | OPV | Bleed Test: $\Delta L^* < 5$// $\Delta a^* < 2$//$\Delta b^* < 2$ | Bleed | Pot Life |
|---|---|---|---|---|
| 1 (Inventive) 1K | OPV 1 | 1.96//−0.45//0.25 | Pass | days |
| 2 (Inventive) 1K | OPV 2 | 0.54//−1.45//−1.02 | Pass | days |
| 3 (Inventive) 1K | OPV 3 | 0.42//−1.04//−0.22 | Pass | days |
| 4 (Comparative) 2K | OPV 4 | +0.10//−0.97//−0.56 | Pass | <1 day |

1K = 1-pack;
2K = 2-pack

Variplus 1201 was blended with a Desmodur N75BA (a HDI biuret isocyanate crosslinker from Bayer Material Science). A multilayer structure was flexographic printed on a clear PET-G label using Fidelity cyan ink (Sun Chemical) followed by two layers of white DPS-261 (Sun Chemical). The last-down was a solvent based OPV from Table 1. Negative values of Δa* are green, negative values of Δb* are blue. Small absolute values of Δa and Δb indicates good caustic resistance, because the OPV prevented inks from bleeding. The inventive Examples 1-4 provide excellent resistance to bleed compared to the comparative urethane based OPV. The comparative example exhibits a short pot life, less than one day, which is not practical for use on a high speed coating line, compared to the inventive OPVs with pot life of several days.

Examples 5-9

Step 1: Preparation of Polymeric Acrylic Stabilizer for Example 5 Through Example 9—

A 3.0 L four-neck flask, equipped with a mechanical stirrer, a reflux-condenser, a thermometer, a nitrogen inlet, and a dropping-funnel, was charged with 460.08 g of n-propyl acetate. The flask was heated with stirring to 100° C. using a mantle heater. 390.39 g of methyl (meth)acrylate (Aldrich) and 499.86 g of butyl acrylate (Acros) were added drop-wise by funnel with 155.38 g of n-propyl acetate and 8.9 g of Luperox 26M50 over 4 hours. After holding the flask for 1 hour at 100° C., 8.46 g of Luperox 26M50 and 1.78 g Luperox P was added in a minute. After holding the flask for 2.0 hours at 100° C., cool the batch to 80° C. and discharge.

Example 5 (Inventive)

Step 2: Preparation of Dispersion—

A 0.5 L four-neck flask, equipped with a mechanical stirrer, a reflux-condenser, a thermometer, a nitrogen inlet, and a dropping-funnel, was charged with 36.0 g of n-propyl acetate, 65.0 g of Step 1 polymeric acrylic stabilizer (above) and the flask was heated with stirring to 100° C. using a mantle heater. 50.8 g 2-acetoacetoxyethyl (meth)acrylate and 27.5 g hydroxyethyl acrylate were added drop-wise by funnel with 18.6 g of n-propyl acetate and 0.8 g of Luperox 26M50 over 3 hours. After holding the flask for 0.5 hour at 90° C., 0.4 g of Luperox 26M50 was added in a minute. After holding the flask for 3.0 hours at 90° C. 186.0 g of n-propanol was added and then the dispersion was discharged. The dispersion had a Mn of 3,817 and 113 mg KOH/g OH value. It had a particle size of 1.6 μm and tack of 7.6 tack units.

Example 6 (Inventive)

Step 2: Preparation of Dispersion—

A 0.5 L four-neck flask, equipped with a mechanical stirrer, a reflux-condenser, a thermometer, a nitrogen inlet, and a dropping-funnel, was charged with 28.8 g of n-propyl acetate, 52.5 g of Step 1 polymeric acrylic stabilizer (above) and the flask was heated with stirring to 100° C. using a mantle heater. 27.2 g 2-acetoacetoxyethyl (meth)acrylate and 29.3 g hydroxyethyl acrylate were added drop-wise by funnel with 14.9 g of n-propyl acetate and 0.6 g of Luperox 26M50 over 3 hours. After holding the flask for 0.5 hour at 90° C., 0.3 g of Luperox 26M50 was added in a minute. After holding the flask for 3.0 hours at 90° C., 148.8 g of n-propanol was added and then the dispersion was discharged. The dispersion had a Mn of 3,881 and 250 mg KOH/g OH value. It had a particle size of 1.4 μm and tack of 8.8 tack units.

The non-aqueous dispersions produced in Examples 5 and 6 were used without further modification as OPVs. A layered structure was prepared by first flexographic printing Harmony USA cyan ink (Sun Chemical) onto a corona treated polyethylene (~37 dyne) substrate and drying same in at oven at 50° C. for 60 s. The OPV layer was applied over the ink with a using Phantom Flexo Proofer (Harper) 200 line/6.8 bpm and dried in an oven at 50° C. for 90 s. Harmony Gloss (Sun Chemical CRYFS0096083) is a 1K solvent based coating and TLXGS0612936 (Sun Chemical) is a 2K solvent based coating.

TABLE 3

| 20 Rub Cycles Mineral Oil Resistance of OPV over Harmony Cyan on PE | | | |
|---|---|---|---|
| Example 5 (Inventive) | Example 6 (Inventive) | HARMONY Gloss | TLXGS0612936 |
| 20 Q-tip 3 | 2 | 4 | 3 |

Table 5 demonstrates that mineral oil resistance is better than Harmony Gloss, a commercial 1K coating. Both Example 5 and Example 6 have equal mineral oil resistance to the 2K solvent based coating which is an improvement in that the 2K coating has a pot life of 3 hours and the inventive coatings have indefinite pot life so are not prone to drying in on the press.

Example 7 (Inventive)

Step 2: Preparation of Dispersion—

A 0.5 L four-neck flask, equipped with a mechanical stirrer, a reflux-condenser, a thermometer, a nitrogen inlet, and a dropping-funnel, was charged with 42.0 g of n-propyl acetate, 76.60 g of Step 1 polymeric acrylic stabilizer (above) and the flask was heated with stirring to 90° C. using a mantle heater. 59.20 g 2-acetoacetoxyethyl (meth)acrylate and 32.1 g hydroxyethyl acrylate were added drop-wise by funnel with 21.7 g of n-propyl acetate and 0.90 g of Luperox 26M50 over 3 hours. After holding the flask for 0.5 hour at 90° C., 0.5 g of Luperox 26M50 was added in a minute. After holding the flask for 3.0 hours at 90° C., the dispersion was discharged. The dispersion had a Mn of 4,689 and 161 mg KOH/g OH value. It had a particle size of 0.5 μm and tack of 5.4 tack units.

Example 8 (Inventive)

Step 2: Preparation of Dispersion—

A 0.5 L four-neck flask, equipped with a mechanical stirrer, a reflux-condenser, a thermometer, a nitrogen inlet, and a dropping-funnel, was charged with 52.5 g of n-propyl acetate, 53.2 g of Step 1 polymeric acrylic stabilizer (above) and the flask was heated with stirring to 90° C. using a mantle heater. 32.5 g hydroxyethyl acrylate was pre-mixed with 36.4 g of hydroxyethyl (meth)acrylate and added drop-wise by funnel with 28.0 g of n-propyl acetate and 0.70 g of Luperox 26M50 over 3 hours. After holding the flask for 0.5 hour at 90° C., 0.3 g of Luperox 26M50 was added in a minute. After holding the flask for 3.0 hours at 90° C., the dispersion was discharged. The dispersion had a Mn of 4,178 and 312 mg KOH/g OH value. It had a particle size of μm and tack of 1.9 tack units.

Example 7 and Examples 8 were used without further modification as OPV. Both ink and OPV were applied using Phantom Flexo Proofer (Harper) 200 line/6.8 bpm. A layered structure was prepared by first printing Harmony USA cyan ink (Sun Chemical) onto corona treated polyethylene (~37 dyne) and dried in at oven at 50° C. for 60 s. The OPV was applied over the ink and dried in an oven at 50° C. for 90 s. Harmony Gloss (Sun Chemical) is a 1K solvent based coating and TLXGS0612936 (Sun Chemical) is a 2K solvent based coating.

TABLE 4

| 20 Rub Cycles Mineral Oil Resistance of OPV over Harmony Cyan on PE | | | |
|---|---|---|---|
| Example 7 (Inventive) | Example 8 (Inventive) | HARMONY Gloss | TLXGS0612936 |
| 20 Q-tip 2 | 1 | 4 | 3 |

This example demonstrates that mineral oil resistance is better for both inventive examples than for the commercial 1K coating, Harmony Gloss and the 2K solvent based coating.

TABLE 5

| 20 Rub Cycles Mineral Oil Resistance of OPV over Harmony Cyan on PE | | |
|---|---|---|
| Example 8 (Inventive) with NC Cyan base | Variplus SK | Harmony USA Cyan Ink |
| 20 Q-tip 4 | 10 | 10 |

An ink was made by combining 66% of a nitrocellulose (NC) cyan base with Example 8. In comparison, the Harmony USA cyan ink provided no resistance to the mineral oil rub test after 20 cycles, the inks based on Example 8 yielded a score of 4, which is comparable to the ink in Table 4 with commercial Harmony Gloss OPV over Harmony USA Cyan ink. Therefore, resistance of the ink alone (rated as 4 in Table 5) was improved to equal the resistance of ink with a comparative OPV (rated as 4 in Table 4).

Example 9 (Inventive)

Step 2: Preparation of Dispersion—

A 0.5 L four-neck flask, equipped with a mechanical stirrer, a reflux-condenser, a thermometer, a nitrogen inlet, and a dropping-funnel, was charged with 21.6 g of n-propyl acetate, 34.7 g of Step 1 polymeric acrylic stabilizer (above) and the flask was heated with stirring to 90° C. using a mantle heater. 15.4 g 2-acetoacetoxyethyl (meth)acrylate and 25.1 g hydroxyethyl acrylate were added drop-wise by funnel with 14.4 g of n-propyl acetate and 0.40 g of Luperox 26M50 over 3 hours. After holding the flask for 0.5 hour at 90° C., 0.2 g of Luperox 26M50 was added in a minute. After holding the flask for 3.0 hours at 90° C., 90.0 g of n-propanol was added and then the dispersion was discharged. The dispersion had a Mn of 4,582 and 199 mg KOH/g OH value. It had a particle size of 1.6 µm and tack of 3.6 tack units.

Example 9 was used without further modification. Both ink and OPV were applied using Phantom Flexo Proofer (Harper) 200 line/6.8 bpm. A layered structure was prepared by first printing Harmony USA cyan ink (Sun Chemical) on onto corona treated polyethylene (~37 dyne) and dried in at oven at 50° C. for 60 s. The OPV was applied over the ink and dried in an oven at 50° C. for 90 s.

TABLE 6

| | 100 Rub Cycles Mineral Oil Resistance of OPV over Harmony Cyan on PE | |
|---|---|---|
| | Example 9 (Inventive) | Variplus SK | Harmony USA Cyan Ink |
| 100 Q-tip | 5 | 10 | 10 |

Variplus SK, a commercial acrylic solution with hydroxyl functionality, was compared to Inventive Example 9. Example 9 had superior mineral oil resistance whereas the commercial solution acrylic with hydroxyl functionality provided no protection to mineral oil and yielded the same poor resistance as the ink alone.

Example 10—NAD Medium Exchange

Transfer from of the polar polymer microparticles from the original medium of the non-aqueous dispersion another medium, such as an acrylate monomer, may in some instances be desirable, since the newly formulated NAD, which is solvent free, may be formulated into energy curable inks or coatings.

A non-aqueous dispersion (NAD) comprising polar polymeric particles produced in accordance with any one of Examples 1-3 and 5-9 and n-propyl acetate is placed into a flask and 4-methoxyphenol is added. The flask contents are heated to 70° C. with stirring. Di(trimethylolpropane) tetraacrylate (DTMPTA) is charged to the flask for about 10 minutes and then the temperature of the flask contents is increased to 110° C., with air bubbled in to the contents. At 110° C., the acetate medium starts to distill. The distilling acetate is collected as a distillate. When most of the acetate is collected, vacuum is applied to the flask, allowing for periods of air to still be bubbled in.

The present invention has been described in detail, including preferred embodiments thereof, but is more broadly applicable as will be understood by those skilled in the art. The methods and compositions included in this disclosure are not intended to be limited to the specific descriptions herein but also include modifications and adaptions that could be made by those skilled in the art. The examples above illustrate specific aspects of the present invention and are not intended to limit the scope thereof in any respect and should not be so construed. It will be appreciated that those skilled in the art, upon consideration of the present disclosure, may make modifications and/or improvements on this invention that fall within the scope and spirit of the invention. Since modifications will be apparent to those of skill in the art, it is intended that the present invention be limited only by the scope of the following claims.

What is claimed is:

1. A polar non-aqueous dispersion comprising:
   (a) polar polymeric microparticles having one or more polar functional groups, wherein the one or more polar functional groups are selected from the group consisting of hydroxyl groups, carbonyl groups, ether groups, ester groups, amide groups, amino groups, halogenated hydrocarbon groups, nitrile groups, and combinations thereof, wherein the polar polymeric particles contain no carboxylic acid functionality; and
   (b) a polar non-aqueous medium;
   wherein:
      (i) the polar polymeric microparticles are insoluble in the polar non-aqueous medium;
      (ii) the polar polymeric microparticles are produced by dispersion polymerization of one or more vinyl monomers in the polar non-aqueous medium in the presence of a polymeric acrylic stabilizer, wherein:
         at least one vinyl monomer is a hydroxyalkyl ester of αβ-unsaturated carboxylic acids with primary or secondary hydroxyl groups; and
         the sum of the amount of vinyl monomers selected from the group consisting of, betacarboxyethylacrylate, 2-hydroxyethyl acrylate, and acrylonitrile, and mixtures thereof is less than 50 wt %, based on the total weight of all the vinyl monomers;
      wherein no unsaturated carboxylic acids are included in the dispersion polymerization of one or more vinyl monomers.

2. The polar non-aqueous dispersion of claim 1, wherein the polar non-aqueous medium is comprised of esters, ketones, and mixtures thereof, wherein the vinyl monomers are soluble in the medium.

3. The polar non-aqueous dispersion of claim 1, wherein the polar non-aqueous medium is selected from n-propyl acetate, ethyl acetate, n-butyl acetate, n-hexyl acetate, methyl ethyl ketone; methyl isobutyl ketone, and mixtures thereof.

4. The polar non-aqueous dispersion of claim 1, wherein the vinyl monomer component comprising hydroxyalkyl esters of αβ-unsaturated carboxylic acids with primary or secondary hydroxyl groups is selected from hydroxyethyl acrylate, hydroxypropyl acrylate, hydroxylbutyl acrylate, hydroxyamyl acrylate, hydroxylhexyl acrylate, hydroxyoctyl acrylate, the corresponding (meth)acrylates thereof; 2-hydroxypropyl acrylate, 2-hydroxybutyl acrylate, 3-hydroxybutyl acrylate, the corresponding (meth)acrylates thereof; and mixtures of the above.

5. The polar non-aqueous dispersion of claim 1, wherein the vinyl monomer component comprising one or more other vinyl monomers are selected from functional or non-functional vinyl monomers selected from acetoacetoxyethyl (meth)acrylate, methyl (meth)acrylate, ethyl (meth)acrylate, propyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, octadecenyl (meth)acrylate, maleic acid esters thereof, fumaric acid esters thereof, crotonic acid esters thereof, isocrotonic acid esters thereof, vinylacetic acid esters thereof, itaconic acid esters thereof; alkoxyethyl acrylates, aryloxyethyl acrylates, corresponding (meth)acrylates thereof; unsaturated compounds with tertiary amino groups; acrylonitrile, methacrylonitrile, acrolein, methacrolein; and mixtures of the above.

6. The polar non-aqueous dispersion of claim 1, wherein the polymeric acrylic stabilizer comprises a polymerization product comprised of vinyl monomers selected from non-functional vinyl monomers; hydroxyl-functional vinyl monomers; glycidyl-functional vinyl monomers; amino-functional vinyl monomers; silane-functional vinyl monomers; N-alkoxyalkyl functional vinyl monomers, and mixtures thereof.

7. The polar non-aqueous dispersion of claim 1, wherein the dispersion polymerization of one or more vinyl monomers in the polar non-aqueous medium takes place in the presence of a polymerization initiator.

8. The polar non-aqueous dispersion of claim 7, wherein the polymerization initiator is selected from the group consisting of a peroxy initiator, a persulfate initiator, a perborate initiator, a percarbonate initiator, an azo compound initiator, and mixtures thereof.

9. The polar non-aqueous dispersion of claim 1, wherein the polar polymeric microparticles comprise crosslinked polymer chains.

10. The non-aqueous dispersion of claim 1, wherein the particle size of the polar polymeric microparticles is about 0.1 microns to about 5 microns.

11. The polar non-aqueous dispersion of claim 1, wherein the particle size of the polar polymeric microparticles is about 0.3 microns to about 0.9 microns.

12. The polar non-aqueous dispersion of claim 1, wherein the dispersion has a number average molecular weight (Mn) of at least 1,000 Dalton.

13. The polar non-aqueous dispersion of claim 1, wherein the dispersion has a number average molecular weight (Mn) greater than about 33,000 Daltons.

14. A polar non-aqueous dispersion comprising the polar polymeric microparticles of the polar non-aqueous dispersion of claim 1, transferred to a second polar non-aqueous medium that is different from the polar non-aqueous medium of claim 1.

15. An ink, coating, primer, or overprint varnish composition, comprising the polar non-aqueous dispersion of claim 1.

16. The ink, coating, primer, or overprint varnish composition of claim 15, comprising, by weight, about 1% to about 90% of the polar non-aqueous dispersion.

17. A process of coating a substrate to improve wear resistance, comprising applying the ink, coating, primer, or overprint varnish composition of claim 15 to a substrate.

18. The process of claim 17, wherein the ink, coating, primer, or overprint varnish is applied by a deposition method selected from flexo, litho offset, gravure, screen, digital, rod, curtain, cascade, roll, slot, spray, and a combination thereof.

19. A multilayer structure comprising:
a substrate, optionally having a primer layer applied thereto;
a plurality of ink layers;
optionally, an overprint varnish layer, wherein one or more of the layers comprises the polar non-aqueous dispersion of claim 1.

20. A multilayer structure comprising:
a substrate, optionally having a primer layer applied thereto;
a plurality of ink layers;
optionally, an overprint varnish layer, wherein one or more of the layers comprises the polar non-aqueous dispersion of claim 9.

21. The polar non-aqueous dispersion of claim 1, wherein the amount of (a) betacarboxyethylacrylate, 2-hydroxyethyl acrylate, acrylonitrile, and mixtures thereof is less than 50 wt %; and the amount of vinyl monomer other than those in (a) is greater than 50 wt %.

* * * * *